US008768556B2

(12) United States Patent  
Ben-Arie et al.

(10) Patent No.: US 8,768,556 B2  
(45) Date of Patent: Jul. 1, 2014

(54) PROTECTION ENVELOPE SWITCHING

(75) Inventors: Gershon Ben-Arie, Binyamina (IL); Ilana Segall, Haifa (IL); Asi Dotan, Atlit (IL)

(73) Assignee: Elbit Systems Ltd., Haifa (IL)

( * ) Notice: Subject to any disclaimer, the term of this patent is extended or adjusted under 35 U.S.C. 154(b) by 438 days.

(21) Appl. No.: 12/945,449

(22) Filed: Nov. 12, 2010

(65) Prior Publication Data

US 2011/0125346 A1     May 26, 2011

Related U.S. Application Data

(63) Continuation-in-part of application No. PCT/IL2009/000490, filed on May 14, 2009.

(30) Foreign Application Priority Data

May 14, 2008    (IL) .......................................... 191438  
May 11, 2009    (IL) .......................................... 198691

(51) Int. Cl.  
*G01C 22/00*       (2006.01)

(52) U.S. Cl.  
USPC .......... 701/25; 701/3; 701/4; 701/7; 701/120; 701/470; 340/501; 340/511; 340/500; 340/940; 340/988

(58) Field of Classification Search  
USPC ....................................................... 701/408  
See application file for complete search history.

(56) References Cited

U.S. PATENT DOCUMENTS

| | | | |
|---|---|---|---|
| 5,892,462 A | | 4/1999 | Tran |
| 5,901,272 A | * | 5/1999 | Schaefer et al. ................ 706/17 |
| 6,393,362 B1 | * | 5/2002 | Burns ........................... 701/301 |
| 6,583,733 B2 | | 6/2003 | Ishihara et al. |
| 7,027,953 B2 | * | 4/2006 | Klein ............................ 702/184 |
| 8,140,264 B2 | | 3/2012 | Salmon et al. |
| 8,144,005 B2 | * | 3/2012 | Hu et al. ....................... 340/501 |
| 2002/0030610 A1 | | 3/2002 | Ishihara et al. |
| 2002/0055086 A1 | * | 5/2002 | Hodgetts et al. ................ 434/37 |

(Continued)

FOREIGN PATENT DOCUMENTS

| | | |
|---|---|---|
| FR | 2 813 963 | 3/2002 |
| FR | 2 864 270 | 6/2005 |

(Continued)

OTHER PUBLICATIONS

Goff et al. "A Neural Network Approach to Prediction Airspeed in Helicopters." *Neural Comput & Applic.* vol. 9. 2009. pp. 73-82.

(Continued)

*Primary Examiner* — Redhwan K Mawari

(74) *Attorney, Agent, or Firm* — Merchant & Gould P.C.

(57) ABSTRACT

An apparatus defines a protection envelope in an aircraft, including a processor and at least one sensor, each sensor being coupled with the processor, the processor executing at least one neural network based algorithm. The at least one sensor monitors flight parameters of the aircraft thereby generating monitored flight parameters. The processor divides the performance envelope of the aircraft into predefined flight regimes, wherein for each predefined flight regime, the processor defines and stores a suitable protection envelope. The processor determines an estimated flight regime of the aircraft using the neural network based algorithm based on the monitored flight parameters. The processor selects a respective suitable protection envelope for the aircraft based on the estimated flight regime.

17 Claims, 2 Drawing Sheets

(56) References Cited

U.S. PATENT DOCUMENTS

| | | | |
|---|---|---|---|
| 2002/0120400 A1* | 8/2002 | Lin | 701/214 |
| 2003/0107499 A1 | 6/2003 | Lepere et al. | |
| 2004/0010354 A1* | 1/2004 | Nicholas et al. | 701/4 |
| 2004/0193386 A1* | 9/2004 | Flynn et al. | 702/173 |
| 2005/0096873 A1* | 5/2005 | Klein | 702/184 |
| 2006/0074559 A1 | 4/2006 | Meunier | |
| 2006/0155432 A1* | 7/2006 | Brown | 701/14 |
| 2006/0290531 A1* | 12/2006 | Reynolds et al. | 340/961 |
| 2008/0195301 A1 | 8/2008 | Fabre et al. | |
| 2011/0125346 A1* | 5/2011 | Ben-Arie et al. | 701/3 |

FOREIGN PATENT DOCUMENTS

| | | |
|---|---|---|
| FR | 2 884 953 | 10/2006 |
| WO | WO 86/05021 | 8/1986 |
| WO | WO 00/39775 | 7/2000 |
| WO | WO 00/48049 | 8/2000 |
| WO | WO 02/21229 | 4/2002 |
| WO | WO 2004/010079 | 1/2004 |
| WO | WO 2004/055477 | 7/2004 |
| WO | WO 2004/055752 | 7/2004 |
| WO | WO 2004/102296 | 11/2004 |
| WO | WO 2005/031262 | 4/2005 |
| WO | WO 2005/069093 | 7/2005 |
| WO | WO 2005/069255 | 7/2005 |
| WO | WO 2005/095888 | 10/2005 |
| WO | WO 2005/109138 | 11/2005 |
| WO | WO 2005/124279 | 12/2005 |
| WO | WO 2006/029935 | 3/2006 |
| WO | WO 2006/032549 | 3/2006 |
| WO | WO 2006/051031 | 5/2006 |
| WO | WO 2006/111480 | 10/2006 |
| WO | WO 2007/054482 | 5/2007 |
| WO | WO 2007/063070 | 6/2007 |
| WO | WO 2007/065781 | 6/2007 |
| WO | WO 2008/031723 | 3/2008 |

OTHER PUBLICATIONS

Berry et al., Automatic Regime Recognition Using Neural Networks, U.S. Army RDECOM Aviation Engineering Directorate, Redstone Arsenal AL, Intelligent Automation Corporation, Copyright 2004 by the American Helicopter Society International, Inc., 9 pages.

Wu et al., A Practical Regime Prediction Approach for HUMS Applications, Department of Mechanical & Industrial Engineering, The University of Illinois at Chicago, Goodrich Sensors and Integrated Systems, Copyright 2007 by the American Helicopter Society International, Inc., 8 pages.

* cited by examiner

PROTECTION ENVELOPE SWITCHING

This application is a Continuation-in-Part of International Application No. PCT/IL2009/00490, filed 14 May 2009, which claims benefit of Ser. No. 191438, filed 14 May 2008 in Israel and Ser. No. 198691, filed 11 May 2009 in Israel and which applications are incorporated herein by reference. To the extent appropriate, a claim of priority is made to each of the above disclosed applications.

FIELD OF THE DISCLOSED TECHNIQUE

The disclosed technique relates to methods and systems for selecting protection envelopes in aircraft avoidance systems.

BACKGROUND OF THE DISCLOSED TECHNIQUE

Aircraft avoidance systems and aircraft warning systems, such as terrain awareness warning systems, are systems used in aircraft, such as fixed wing and rotary wing aircraft, for reducing controlled flight into terrain (herein abbreviated CFIT). CFIT generally refers to an accident whereby an airworthy aircraft inadvertently flies into an obstacle, terrain or water. An aircraft avoidance system operates by providing warnings, either visual, audio or both, to a pilot that his aircraft is in danger of CFIT. Aircraft avoidance systems usually determine the presence of a CFIT danger by at least one of two subsystems, known in the art as ground proximity warning systems (herein abbreviated GPWS) and forward looking terrain avoidance (herein abbreviated FLTA) systems.

In general, FLTA systems operate by executing three major functions. The first function is the definition of a protection envelope around an aircraft. The protection envelope is essentially virtual and defines a volume surrounding the aircraft. Typically, the dimensions of the protection envelope are a function of the aircraft's performance envelope and its flight dynamics during a particular flight. Once a protection envelope has been defined, the second function of FLTA systems is executed. In this function, the protection envelope is constantly compared with terrain elevation data, from a terrain elevation database, at the geographic position of the protection envelope. In other words, the position of the protection envelope at a given moment is compared with terrain elevation data at that given position. The third function of FLTA systems is to issue a warning or an alert to a pilot if the comparison of the second function shows that the protection envelope bisects terrain or an obstacle, or bisects a predetermined safety margin above the terrain or obstacle.

FLTA systems and aircraft avoidance systems are known in the art. In such systems, the protection envelopes are usually defined based on the speed, or velocity, of an aircraft as well as on the predicted flight path of the aircraft. For example, U.S. Pat. No. 6,583,733 to Ishihara, et al., entitled "Apparatus, method and computer program product for helicopter ground proximity warning system" is directed towards a system and method for alerting a pilot of a rotary wing aircraft of the aircraft's proximity to terrain. The method comprises the steps of defining a first set of terrain awareness protection envelopes for alerting a pilot of proximity to terrain during a first set of flight operations and also defining a second set of terrain awareness protection envelopes for alerting the pilot of proximity to terrain during a second set of flight operations. In the method, a signal is received which is indicative of which set of flight operations the aircraft is in. Depending on the signal received, the appropriate protection envelope is calculated dynamically from the first set or second set of terrain awareness protection envelopes. Given the calculated protection envelope, stored terrain data is accessed, and an alert is outputted when the stored terrain data lies within a boundary of the selected protection envelope. The first set of envelopes and the second set of envelopes are determined as a function of a terrain floor boundary and a look ahead distance, with the terrain floor boundary being a function of the speed and altitude of the aircraft.

SUMMARY OF THE PRESENT DISCLOSED TECHNIQUE

It is an object of the disclosed technique to provide a novel method and system for selecting protection envelopes in avoidance and alerting systems based on particular flight parameters, which overcomes the disadvantages of the prior art.

In accordance with the disclosed technique, there is thus provided an apparatus for defining a protection envelope in an aircraft, which includes a processor and at least one sensor. Each sensor is coupled with the processor. The processor is for executing at least one neural network based algorithm, and the at least one sensor is for monitoring a plurality of flight parameters of the aircraft, thereby generating a plurality of monitored flight parameters. The processor divides the performance envelope of the aircraft into predefined flight regimes. For each predefined flight regime, the processor defines and stores a suitable protection envelope. The processor determines an estimated flight regime of the aircraft using the neural network based algorithm based on the plurality of monitored flight parameters. The processor selects a respective suitable protection envelope for the aircraft based on the estimated flight regime.

According to another aspect of the disclosed technique, there is thus provided a method for defining a protection envelope in an aircraft. The method includes the procedures of monitoring a plurality of flight parameters of the aircraft, executing a planning phase for an alerting system in the aircraft, determining an estimated flight regime for the aircraft based on the monitored plurality of flight parameters using a calibrated neural network based algorithm, and selecting a suitable protection envelope for the aircraft based on the estimated flight regime. The procedure of executing the planning phase includes the sub-procedures of dividing the performance envelope of the aircraft into predefined flight regimes, for each predefined flight regime, defining and storing a suitable protection envelope, and calibrating a neural network based algorithm to map the monitored flight parameters to a suitable protection envelope for the aircraft based on the estimated flight regime.

According to a further aspect of the disclosed technique, there is thus provided a method for a planning phase of an alerting system in an aircraft. The method includes the procedures of dividing the performance envelope of the aircraft into predefined flight regimes, for each predefined flight regime, defining and storing a suitable protection envelope, monitoring a plurality of flight parameters of the aircraft, and calibrating a neural network based algorithm to determine an estimated flight regime of the aircraft based on the monitored plurality of flight parameters.

According to another aspect of the disclosed technique, there is thus provided a method for obstacle avoidance in an aircraft. The method includes the procedures of dividing the performance envelope of the aircraft into predefined flight regimes, for each predefined flight regime, defining and storing a suitable protection envelope, and monitoring a plurality of flight parameters of the aircraft, in which the plurality of flight parameters includes a first set of flight parameters and a second set of flight parameters. The method also includes the procedures of determining an estimated flight regime of the aircraft based on the first set of flight parameters using a neural network based algorithm, selecting a respective suitable protection envelope for the aircraft based on the estimated flight regime, and modifying at least one dimension of the respective suitable protection envelope for the aircraft based on the second set of flight parameters.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a novel system and method for defining and selecting protection envelopes in an aircraft awareness and avoidance systems, such as an FLTA system, at a given time for particular flight parameters. The protection envelopes are selected from a list of protection envelopes predefined for different aircraft flight regimes. The selection is executed using a neural network based algorithm which receives a plurality of flight parameters for determining the most suitable protection envelope given the current flight parameters of an aircraft. It is noted that the disclosed technique applies to fixed wing as well as rotary wing aircraft. As an example of the disclosed technique, the disclosed technique is described herein as it relates to an FLTA system coupled with a terrain awareness avoidance system (herein abbreviated TAWS). In general, the disclosed technique can be used with any known aircraft awareness system, aircraft avoidance system, alerting system or obstacle avoidance system.

Figure 1:
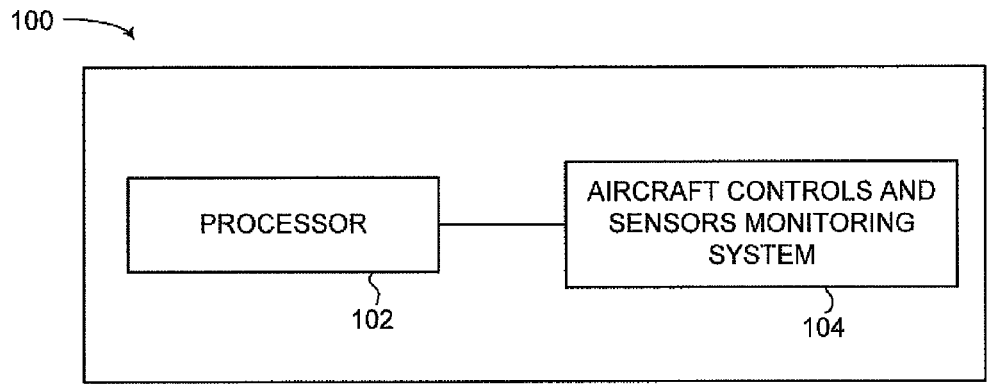
FIG. 1 is a schematic illustration of a protection envelope system, constructed and operative in accordance with an embodiment of the disclosed technique.

Reference is now made to FIG. 1, which is a schematic illustration of a protection envelope system, generally referenced 100, constructed and operative in accordance with an embodiment of the disclosed technique. Protection envelope system 100 may be generally coupled with an aircraft alerting system, an avoidance system or an aircraft warning system, such as a TAWS (not shown) or an FLTA system (not shown). Protection envelope system 100 includes a processor 102 and an aircraft controls and sensors monitoring system 104. Processor 102 is coupled with aircraft controls and sensors monitoring system 104. Processor 102 is enabled to execute neural network based algorithms. Protection envelope system 100 could also be replaced with any known aircraft awareness system or aircraft avoidance system such as an FLTA system or a TAWS. Protection envelope system 100 may be an alerting system or an obstacle avoidance system. It is noted that before protection envelope system 100 can be used with a TAWS on an aircraft, protection envelope system 100 needs to go through a planning phase. As mentioned above, protection envelope system 100 and its coupling with a TAWS is brought merely as an example. In general, known aircraft awareness systems or aircraft avoidance systems may need to go through a planning phase before being used on an aircraft. In the planning phase, the performance envelope of an aircraft is divided up into a set of predefined flight regimes by an external processor (not shown). This external processor may be processor 102 or another processor. In general, the performance envelope, or flight envelope, of an aircraft refers to the capabilities of an aircraft as a function of its speed and altitude. The set of predefined flight regimes are stored in a memory unit (not shown) coupled with the external processor. The flight regimes substantially relate to intervals of speed. It is noted that in one embodiment, protection envelope system 100 only begins to operate once the aircraft (not shown) it is coupled with attains a certain minimum speed. For example, a rotary wing aircraft might have its flight envelope divided into 6 flight regimes, each flight regime delineating a different interval of speed. Using this example, if speed is measured in knots, then a first interval might be from 10 knots to 20 knots, a second interval might be from 20 knots to 30 knots, a third interval might be from 30 knots to 40 knots, a fourth interval might be from 40 knots to 50 knots, a fifth interval might be from 50 knots to 60 knots and a sixth interval might be from 60 knots to 70 knots. In this example, each speed interval is assigned as a different predefined flight interval. In other words, the external processor assigns each one of the various sections of the performance envelope to a predefined flight regime. In this example, the interval from 0 knots to 10 knots is not considered and a section of the performance envelope is not assigned to this interval as 10 knots is defined as the minimum speed which the aircraft must attain before protection envelope system 100 begins to operate. It is noted that in one embodiment of the disclosed technique, a minimum and maximum number of predefined flight regimes can be defined. For example, for rotary wing aircraft, the minimum number might be 10 flight regimes and the maximum number might be 20 flight regimes, whereas for fixed wing aircraft, the minimum number might be 10 flight regimes and the maximum number might be 30 flight regimes. In the planning phase, for each predefined flight regime, the external processor then defines a suitable protection envelope type which is stored in the memory unit. The protection envelope type can be suited for a particular aircraft type and for a predefined evasive maneuver. Each protection envelope type represents a generalized protection envelope in terms of its dimensions for each predefined flight regime. The protection envelopes types stored in the memory unit are provided to processor 102. The protection envelopes can also be stored on a memory unit (not shown) coupled with processor 102. At this point, the planning phase is complete and protection envelope system 100 can be used with a TAWS on an aircraft in an operational phase. As described below, once operational, protection envelope system 100 determines an estimated flight regime based on various flight parameters. Based on the estimated flight regime, processor 102 then selects a corresponding protection envelope type, which was defined for a predefined flight regime, and determines the particular dimensions of the selected protection envelope to be used based on the flight parameters.

Aircraft controls and sensors monitoring system 104 is a sensor capable of monitoring various flight parameters of an aircraft. In the embodiment in FIG. 1, aircraft controls and sensors monitoring system 104 is a single sensor. In another embodiment of the disclosed technique, a plurality of sensors is used to monitor various flight parameters of the aircraft. In particular, aircraft controls and sensors monitoring system 104 monitors the flight parameters as shown below in Table 1, depending on which type of aircraft, fixed wing or rotary wing, protection envelope system 100 is coupled with.

TABLE 1

Flight Parameters Monitored in an Aircraft

| Rotary Wing Aircraft | Fixed Wing Aircraft |
| --- | --- |
| Weight | Weight |
| Center of gravity | Center of gravity |
| Longitudinal cyclic position | Longitudinal stick position |
| Lateral cyclic position | Lateral stick position |
| Collective position | Pedal position/Rudder position |
| Pedal position/Tail rotor pitch | Pitch attitude |
| Pitch attitude | Roll attitude |
| Roll attitude | Pitch rate |
| Pitch rate | Roll rate |
| Roll rate | Yaw rate |
| Yaw rate | Altitude |
| Main rotor torque | Engine RPM (revolutions per minute) |
| Tail rotor torque | Engine EGT (exhaust gas temperature) |
| Main rotor speed | Propeller pitch |
| Tail rotor speed | Nozzle position |
| Wind speed | Wind speed |
| Vertical speed | Vertical speed |
| Altitude | |
| Longitudinal acceleration | |
| Lateral acceleration | |
| Vertical acceleration | |

Regarding the flight parameters monitored for rotary wing aircraft, pedal position and tail rotor pitch refer to substantially the same measurement. Regarding the flight parameters monitored for fixed wing aircraft, pedal position and rudder position refer to substantially the same measurement. Also, the flight parameters engine EGT, propeller pitch and nozzle position are not always available or applicable to all types of aircraft engines as parameters which can be monitored on all fixed wing aircraft. Therefore, these flight parameters are monitored only if they are available to aircraft controls and sensors monitoring system 104. Regarding the flight parameters monitored in rotary wing aircraft, the flight parameters: longitudinal cyclic position, lateral cyclic position, collective position and pedal position/tail rotor pitch are not always available or applicable to all types of rotary wing aircraft. For example, high-end helicopters may be able to monitor the aforementioned flight parameters, whereas low-end helicopters may not be able to monitor such flight parameters.

In the operational phase of protection envelope system 100, in general, aircraft controls and sensors monitoring system 104 monitors the above enumerated flight parameters in Table 1 and provides those flight parameters to processor 102. Based on the received flight parameters, processor 102 utilizes a neural network based algorithm to determine an estimated flight regime. It is noted that in one embodiment of the disclosed technique, a subset of the flight parameters listed in Table 1 is used by the neural network based algorithm to determine an estimated flight regime. An example of a subset of the flight parameters listed in Table 1 is shown below in Table 2 for rotary wing aircraft. In this example, the flight parameters monitored are separated into mandatory flight parameters which must be monitored and optional flight parameters which can be monitored if available or applicable to a particular type of rotary wing aircraft. According to this embodiment of the disclosed technique, optional flight parameters do not need to be monitored at all. The mandatory flight parameters can be divided up into a plurality of sets, where each set represents a particular type or classification of rotary wing aircraft. For example, one set could be defined for high-end rotary wing aircraft with another set defined for low-end rotary wing aircraft. High-end rotary wing aircraft may include dual pilot dual engine helicopters, whereas low-end rotary wing aircraft may include small single engine single pilot helicopters.

TABLE 2

Subset of Flight Parameters Monitored in a Rotary Wing Aircraft

| Flight Parameter | High-End Rotary Wing Aircraft Mandatory Set of Flight Parameters | Low-End Rotary Wing Aircraft Mandatory Set of Flight Parameters | Optional Set of Flight Parameters |
| --- | --- | --- | --- |
| Weight | X | X | |
| Center of gravity | X | X | |
| Longitudinal cyclic position | X | | X |
| Lateral cyclic position | X | | X |
| Collective position | X | | X |
| Pedal position/Tail rotor pitch | X | | X |
| Pitch attitude | X | X | |
| Roll attitude | X | X | |
| Pitch rate | X | X | |
| Roll rate | X | X | |
| Yaw rate | X | X | |
| Main rotor torque | X | X | |
| Tail rotor torque | | | X |
| Main rotor speed | | | X |
| Tail rotor speed | | | X |
| Wind speed | X | X | |
| Vertical speed | X | X | |
| Altitude | X | X | |
| Longitudinal acceleration | | X | X |
| Lateral acceleration | | X | X |
| Vertical acceleration | | X | X |

As can be seen from Table 2, for high-end rotary wing aircraft, only the flight parameters for which an 'X' is placed under the 'High-End Rotary Wing Aircraft Mandatory Set of Flight Parameters' column must be monitored and provided to processor 102. For low-end rotary wing aircraft, only the flight parameters for which an 'X' is placed under the 'Low-End Rotary Wing Aircraft Mandatory Set of Flight Parameters' column must be monitored and provided to processor 102. An 'X' in the 'Optional Set of Flight Parameters' column represents a flight parameter which can optionally be monitored, if available and applicable to a particular rotary wing aircraft, if the flight parameter is not included under mandatory set of flight parameters column for either a high-end or low-end rotary wing aircraft. For example, longitudinal cyclic position is a mandatory flight parameter to be monitored for a high-end rotary wing aircraft, whereas it is an optional flight parameter to be monitored for a low-end rotary wing aircraft. Longitudinal acceleration is a mandatory flight parameter to be monitored for a low-end rotary wing aircraft, whereas it is an optional flight parameter to be monitored for a high-end rotary wing aircraft. Tail rotor torque is an optional flight parameter to be monitored for both high-end and low-end rotary wing aircraft.

In the disclosed technique, the neural network based algorithms used are algorithms which attempt to generate a mapping between the monitored flight parameters in Table 1 or Table 2 and a suitable protection envelope type. It is noted that the estimated flight regime represents the flight regime determined by the neural network based algorithm which most closely matches the predefined flight regimes stored in the planning phase. It is noted that the estimated flight regime may not represent the actual flight regime the aircraft is currently in. For example, an aircraft may actually be in a flight regime assigned to a speed interval of between 50 and 60 knots, but based on the various flight parameters determined by aircraft controls and sensors monitoring system 104, the estimated flight regime may be determined to be a flight regime assigned to a speed interval of between 40 and 50 knots, as the received flight parameters correlate more with the 40 to 50 knots flight regime than with the 50 to 60 knots flight regime. The neural network based algorithm can output, for example, a code indicative of the estimated flight regime. For example, an output code of 3 may indicate that, based on the received flight parameters, the aircraft is in a flight regime assigned to a speed interval of between 30 and 40 knots.

Based on the determined estimated flight regime by the neural network based algorithm, processor 102 selects the most suitable protection envelope type for the aircraft. In one embodiment of the disclosed technique, processor 102 uses the dimensions of the protection envelope type stored in the memory unit, or in processor 102, as the protection envelope for protection envelope system 100. In another embodiment of the disclosed technique, processor 102 modifies the dimensions of the selected protection envelope type based on additional flight parameters, such as the vertical speed of the aircraft, the turn rate of the aircraft, the weight of the aircraft and the altitude of the aircraft as well as the estimated flight regime and the particular type and make of the aircraft. In general, aircraft controls and sensors monitoring system 104 can also monitor these flight parameters. It is noted that the weight of the aircraft can also be used as a flight parameter for modifying the dimensions of the selected protection envelope type. In this embodiment, the modified protection envelope is used as the protection envelope for protection envelope system 100. It is noted in particular that, unlike the prior art, protection envelope system 100 does not make use of the speed of the aircraft as a flight parameter for selecting the protection envelope used by protection envelope system 100.

In general, neural network based algorithms require a learning phase, sometimes referred to in the art as a training phase, as well as a testing phase, before they can be used effectively in making a decision. In the art, once a neural network based algorithm has completed its training phase, it is considered calibrated. In protection envelope system 100, the neural network based algorithm is put through a learning phase which is specific for a particular type of aircraft and its specific performance envelope. In general, the learning phase can be executed by using data from a 6 degrees of freedom (herein abbreviated DOF) simulation of the particular type of aircraft or by using data collected from an actual flight of the particular type of aircraft. The data can include the flight parameters which are provided to processor 102 from aircraft controls and sensors monitoring system 104 as well as the correct flight regime for each set of flight parameters inputted during the learning phase. This data is used in the learning phase of the neural network based algorithm as well as in the testing phase of the neural network based algorithm. In general, the testing phase tests the validity of what the neural network based algorithm has "learned" in the learning phase. The learning phase and the testing phase of the neural network based algorithm are described in more detail below in FIG. 3. The learning phase and the testing phase are executed during the planning phase of protection envelope system 100. In one embodiment of the disclosed technique a backpropagation algorithm may be used for executing the learning phase. In another embodiment of the disclosed technique, a resilient backpropagation algorithm, also known as an Rprop algorithm, is used for executing the learning phase.

Figure 2:
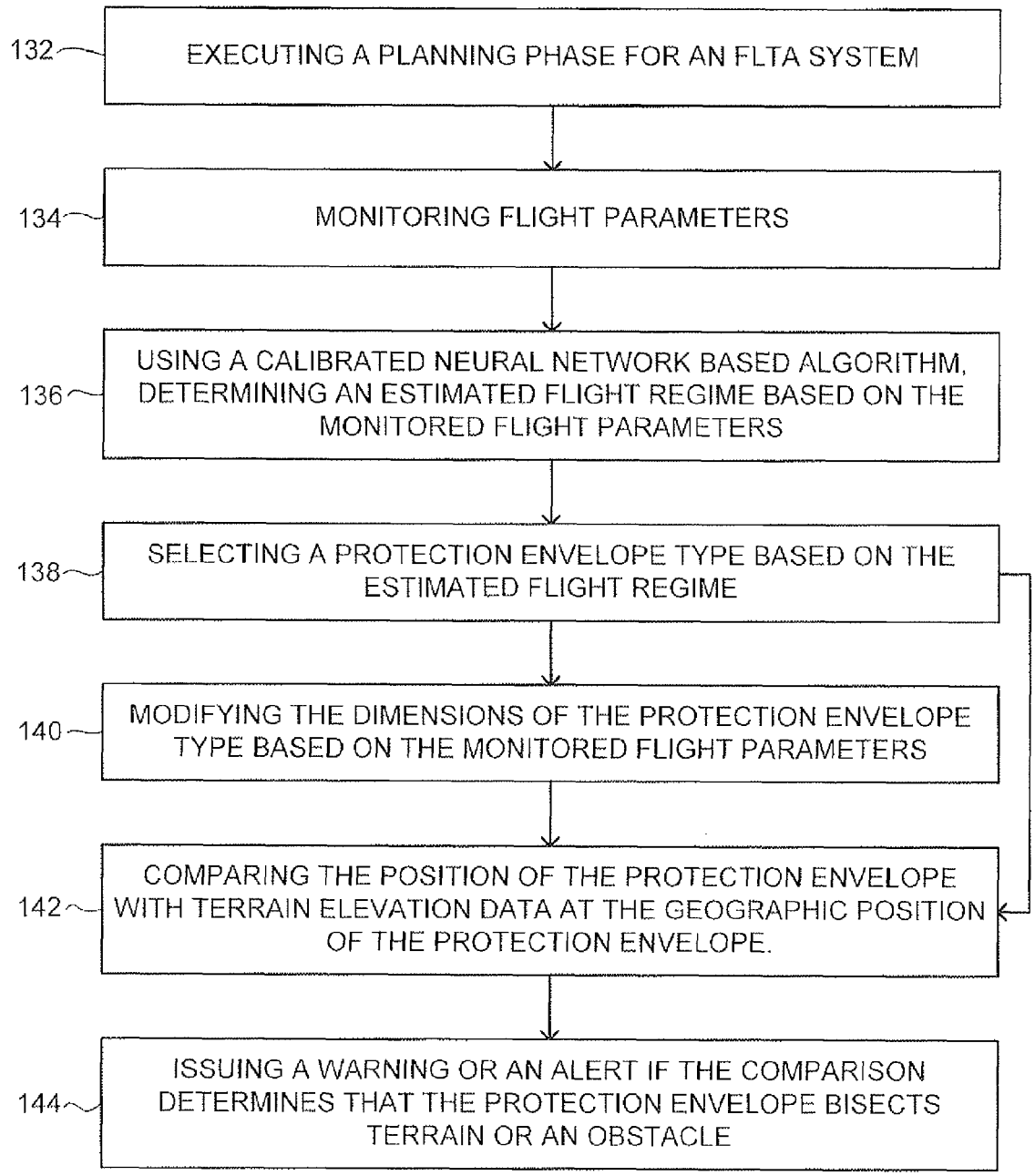
FIG. 2 is a schematic illustration of a protection envelope and obstacle avoidance method, operative in accordance with another embodiment of the disclosed technique.

Reference is now made to FIG. 2, which is a schematic illustration of a protection envelope and obstacle avoidance method, operative in accordance with another embodiment of the disclosed technique. As mentioned above, the method of FIG. 2 is described using the example of an alerting system which could be a protection envelope system, an FLTA system or a TAWS. The method of FIG. 2 can be executed using any known aircraft awareness system or aircraft avoidance system. The method of FIG. 2 can also apply to an alerting system for aircraft or to an obstacle avoidance system in aircraft. In such systems, the method of FIG. 2 is used to define protection envelope types for a pilot in an aircraft in order to provide the pilot with obstacle avoidance warnings and alerts. In procedure 132, a planning phase for an alerting system is executed. This procedure is explained in further detail below with reference to FIG. 3. In general, in this procedure, the performance envelope of a particular type of aircraft is divided into predefined flight regimes with a suitable protection envelope type defined for each predefined flight regime. Also, in this procedure, a neural network based algorithm is calibrated to map monitored flight parameters to suitable protection envelope types. With reference to FIG. 1, it is noted that before protection envelope system 100 (FIG. 1) can be used with a TAWS on an aircraft, protection envelope system 100 needs to go through a planning phase. In the planning phase, the performance envelope of an aircraft is divided up into a set of predefined flight regimes by an external processor (not shown). In procedure 134, various flight parameters of the aircraft are monitored. For example, the flight parameters listed in Table 1 or Table 2 may be monitored, depending on the type of aircraft, fixed wing or rotary wing, the protection envelope and obstacle avoidance method is used with. In addition, the vertical speed of the aircraft and the turn rate of the aircraft can also be monitored. With reference to FIG. 1, aircraft controls and sensors monitoring system 104 (FIG. 1) is a sensor capable of monitoring various flight parameters of an aircraft.

In procedure 136, a calibrated neural network based algorithm is used to determine an estimated flight regime of the aircraft based on the monitored flight parameters in procedure 134. It is noted that in one embodiment of the disclosed technique, a subset of the flight parameters monitored in procedure 134 is used by the neural network based algorithm. With reference to FIG. 1, aircraft controls and sensors monitoring system 104 monitors the above enumerated flight parameters in Table 1 or Table 2 and provides those flight parameters to processor 102 (FIG. 1). Based on the received flight parameters, a neural network based algorithm in processor 102 determines an estimated flight regime. In procedure 138, a suitable protection envelope type is selected for the aircraft based on the estimated flight regime. With reference to FIG. 1, based on the determined estimated flight regime by the neural network based algorithm, processor 102 selects the most suitable protection envelope type for the aircraft. It is noted that in one embodiment of the disclosed technique, after procedure 138 is executed, procedure 142 is executed. In another embodiment of the disclosed technique, after procedure 138 is executed, procedure 140 is executed followed by the execution of procedure 142.

In procedure 140, the dimensions of the selected protection envelope type are modified based on certain monitored flights parameters. In particular, the following flight parameters are used to modify the dimensions of the selected protection envelope type: weight of the aircraft, vertical speed of the aircraft, turn rate of the aircraft and altitude of the aircraft. In addition, the selected protection envelope type can be modified based on the estimated flight regime and the particular type and make of the aircraft. With reference to FIG. 1, in another embodiment of the disclosed technique, processor 102 modifies the dimensions of the selected protection envelope type based on additional flight parameters, such as the vertical speed of the aircraft, the turn rate of the aircraft, weight of the aircraft and the altitude of the aircraft as well as the estimated flight regime and the particular type and make of the aircraft. In procedure 142, the position of the protection envelope is compared with terrain elevation data at the geographic position of the protection envelope. In procedure 144, a warning or alert is issued if the comparison in procedure 142 determines that the protection envelope bisects the terrain or an obstacle. It is noted that a warning or alert can also be issued if the protection envelope bisects a predetermined safety margin above the terrain or an obstacle. In general, procedures 142 and 144 represent standard procedures executed in the functioning of a TAWS and are therefore optional procedures in the method of FIG. 2 which relates more to a method for embodying an alerting system or a protection envelope system.

Figure 3:
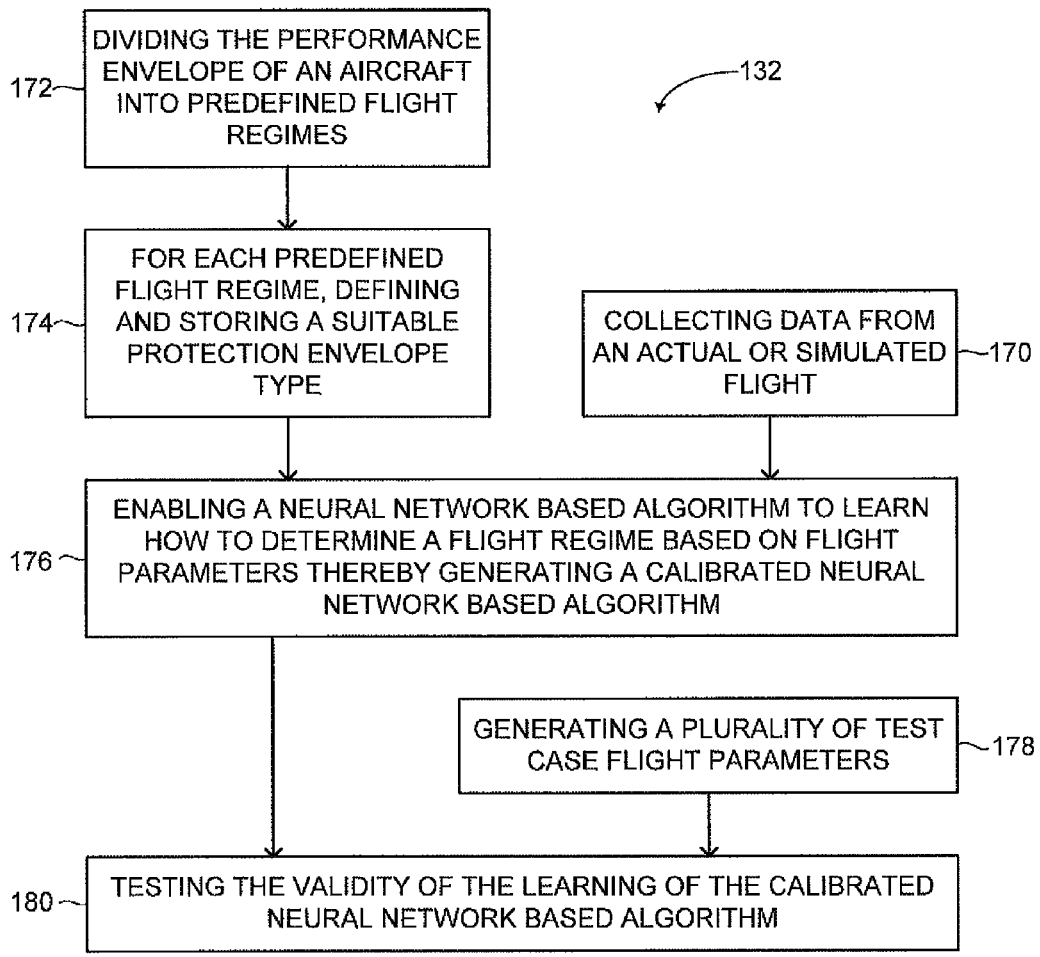
FIG. 3 is a schematic illustration of an alerting system planning phase method, operative in accordance with a further embodiment of the disclosed technique.

Reference is now made to FIG. 3, which is a schematic illustration of an alerting system planning phase method, operative in accordance with a further embodiment of the disclosed technique. As mentioned above, the method of FIG. 3 is described using an alerting system as an example. The method of FIG. 3 can be used to execute a planning phase of any known aircraft awareness system or aircraft avoidance system, for example, such as a protection envelope system, an FLTA system or a TAWS. The method of FIG. 3 represents the sub-procedures executed in procedure 132 in the method of FIG. 2. In procedure 170, data for a particular type of aircraft is collected from either an actual flight of the particular type of aircraft or from a 6 DOF simulation of the particular type of aircraft. In general, this data represents the flight parameters listed above in Table 1 or Table 2. For example, the flight parameters could be stored as a vector, with each vector representing the values of the flight parameters at a particular moment in time. As an example, in order for the neural network based algorithm to "learn," a few hundred vectors could be generated, each one representing a different set of values of the flight parameters in Table 1 or Table 2 at different times. In procedure 172, the performance envelope of a particular type of aircraft is divided into predefined flight regimes. In one embodiment of the disclosed technique, a minimum and maximum number of predefined flight regimes can be defined. With reference to FIG. 1, processor 102 (FIG. 1) receives the performance envelope of an aircraft and divides the performance envelope into a set of predefined flight regimes. In procedure 174, a suitable protection envelope type is defined and stored for each predefined flight regime. In general, the protection envelope types stored represent protection envelopes whose dimensions have been tailored for each particular predefined flight regime. With reference to FIG. 1, for each predefined flight regime, processor 102 defines a suitable protection envelope type which is stored in a memory unit.

In procedure 176, a neural network based algorithm receives as input the data collected in procedure 170 as well as the predefined flight regimes and suitable protection envelope types determined in procedure 174. Using this input, which can be referred to as a learning group, the neural network based algorithm then learns how to determine a flight regime based on flight parameters. For example, using the back-propagation algorithm, for each vector of flight parameters inputted into the neural network based algorithm, as collected above in procedure 170, an expected flight regime is defined. Each flight regime is then assigned a particular suitable protection envelope type. Arbitrary weights are then assigned by which the neural network based algorithm determines a particular flight regime based on flight parameters. Initially, since the weights are arbitrary, the determined flight regimes for each vector of flight parameters by the neural network based algorithm will not match the defined expected flight regime. The difference between the expected flight regime and the determined flight regime by the neural network based algorithm is known as an error. By changing the value of the weights, the neural network based algorithm minimizes the error until it is below a predefined error threshold for each vector of flight parameters. At this point, the neural network based algorithm is considered calibrated, i.e., the weights are calibrated. It is noted that other algorithms known in the art can be used in this procedure for training the neural network based algorithm. In procedure 178, a plurality of flight parameter test cases are generated, which can be referred to as a test group. In general, the flight parameters generated for the test cases are those listed above in Table 1 or Table 2, depending on the type of aircraft the neural network based algorithm is used for. As an example, vectors of flight parameters not used in the learning phase of the neural network based algorithm are generated as test vectors. As seen in FIG. 3, procedures 170, 172, 174 and 176 can be executed simultaneously as procedure 178 is executed. In procedure 180, once the neural network based algorithm has finished its learning phase, the validity, or the performance, of what the neural network based algorithm has learned is tested. In general, the plurality of test case flight parameters generated in procedure 178 is used to test the validity, or the performance, of the learning of the neural network based algorithm in procedure 180. As an example, using the weights determined in the learning phase, the determined flight regime for each vector is compared with the expected flight regime. The neural network based algorithm may pass the testing phase if the error for each test vector is below a predefined error threshold. Once the neural network based algorithm has been calibrated and tested, the planning phase of a protection envelope and obstacle avoidance method is complete. The neural network based algorithm can then be used, as in FIG. 2, in an alerting system operational phase for determining a suitable protection envelope based on inputted flight parameters.

As mentioned above, before a protection envelope system can be used with a TAWS or with other aircraft avoidance systems, a planning phase must be executed on the protection envelope system, as shown in FIG. 3, in which a neural network based algorithm 'learns' how to determine a flight regime based on a set of monitored flight parameters (procedure 176). In general, a neural network based algorithm uses a neural architecture, which includes 3 layers, to 'learn.' In the art these layers are known as an input layer, an output layer and a hidden layer. The hidden layer couples the input layer to the output layer. In the disclosed technique, the input layer is coupled with the flight parameters provided to the neural network based algorithm, the output layer produces the determined flight regime and the hidden layer connects between them. In an embodiment of procedure 176, a neural architecture of 4 layers can be used by the neural network based algorithm to 'learn.' These 4 layers include an input layer, a first hidden layer, a second hidden layer and an output layer. In this neural architecture, the input layer includes 100 neurons, where each neuron represents a vector of inputs, where the inputs could be monitored flight parameters. The input layer is coupled with the first hidden layer, which includes 50 neurons. The first hidden layer is coupled with the second hidden layer, which includes 25 neurons, and the second hidden layer is coupled with the output layer, which includes a single neuron. By using a single neuron in the output layer, a number representing an estimated flight regime based on the inputted flight parameters can be outputted. It is noted that the number outputted by the output layer can also represent a speed interval. In this respect, according to this embodiment of the disclosed technique, the neural network based algorithm can either 'learn' to output a flight regime based on a set of flight parameters, or a speed interval, based on a set of flight parameters. Recall that above, each flight regime is substantially related to an interval of speed.

The neurons in each layer are coupled in a full connectivity configuration. In such a configuration, each neuron in a given layer is coupled with each neuron in the next layer it is coupled with. For example, each of the 100 neurons in the input layer is coupled with each of the 50 neurons in the first hidden layer. Likewise, each of the 50 neurons in the first hidden layer is coupled with each of the 25 neurons in the second hidden layer, and each of the 25 neurons in the second hidden layer is coupled with the single neuron in the output layer. Each neuron operates based on a particular function, known in the art as a transfer function or a firing function. This particular function substantially determines whether a neuron is activated or not depending on its outputted value. In this embodiment of the disclosed technique, each layer in the neural architecture is operated using a different transfer function. The input layer and the second hidden layer both use a logarithm sigmoid function, which gives an output value between 0 and 1. The first hidden layer uses a tangent sigmoid function, which gives an output value between −1 and 1. The output layer uses a linear function which gives an output value for any value. A linear function is used in the output layer to output a whole number which can either represent a flight regime or a particular speed interval.

In this embodiment of procedure 176, the input to this procedure, which is substantially the learning group of monitored flight parameters, may include hundreds of vectors, with each vector representing a set of monitored flight parameters. The learning group may be equally divided up and assigned to a predefined number of flight regimes. Recall that each flight regime can be represented as a speed interval, such as between 77 knots and 88 knots. For example, if 8 flight regimes are defined and the learning group includes 600 vectors, then each flight regime will be assigned 75 vectors. In procedure 176, each of these vectors is used to enable the neural network based algorithm to 'learn' how to determine a flight regime based on a set of flight parameters using a set of weights, as described above. Since the 'learning' of the neural network based algorithm is based on the vectors in the learning group, the determined weights may become biased towards, or specific for the vectors in the learning group as the weights are changed and the difference between the expected flight regime and the determined flight regime by the neural network based algorithm is minimized, which is generally known as an error.

According to this embodiment of procedure 176, an additional group of vectors representing sets of flight parameters, known as a validation group, is inputted to the neural network based algorithm at the same time as the learning group is inputted to the neural network based algorithm. The validation group may also include hundreds of vectors, with each vector representing a set of flight parameters. The validation group is used to generate a stopping rule for stopping the determined weights from being changed. In the learning group, the determined weights are continuously changed to minimize the error, as described above. Each time the weights are changed, the weights are used to check the error in the validation group. In general, as the error in the learning group decreases, the error in the validation group will decrease as well. When the determined weights become too specific for the learning group, the error in the learning group decreases while the error in the validation group increases. At this point, the changing of the weights in the learning group is stopped, and the determined weights which generated a minimal error in the validation group are used as the calibrated weights for the neural network based algorithm. The validation group thereby enables a stopping rule to be defined for changing the weights in the learning group.

In an embodiment of procedure 180, the validity, or the performance, of the neural network based algorithm, based on the calibrated weights, is tested using a test group which may include a plurality of test case flight parameters, as generated in procedure 178. For example, the plurality of test case flight parameters may include hundreds of thousands of vectors, with each vector representing a set of flight parameters. The test group can be used to determine the quality of the learning of the neural network based algorithm and can be used to compare the quality of different calibrated weights for the neural network based algorithm. In general, higher quality calibrated weights will generate a lower error on each vector in the test group.

It will be appreciated by persons skilled in the art that the disclosed technique is not limited to what has been particularly shown and described hereinabove. Rather the scope of the disclosed technique is defined only by the claims, which follow.

The invention claimed is:

1. Apparatus for defining a protection envelope in an aircraft, comprising:
   a processor, for executing at least one neural network based algorithm; and
   at least one sensor, each said at least one sensor coupled with said processor, for monitoring a plurality of flight parameters of said aircraft, thereby generating a plurality of monitored flight parameters, wherein said plurality of monitored flight parameters excludes a speed of said aircraft;
   wherein said processor divides the performance envelope of said aircraft into predefined flight regimes,
   wherein for each said predefined flight regime, said processor defines and stores a suitable protection envelope,
   wherein said processor determines an estimated flight regime of said aircraft using said at least one neural network based algorithm based on said plurality of monitored flight parameters, and
   wherein said processor selects a respective suitable protection envelope for said aircraft based on said estimated flight regime.

2. The apparatus according to claim 1, said apparatus coupled with a forward looking terrain avoidance (FLTA) system.

3. The apparatus according to claim 1, wherein each said predefined flight regime relates to a predefined interval of speed.

4. The apparatus according to claim 1, wherein said apparatus is operational when said aircraft attains a minimum speed.

5. The apparatus according to claim 1, wherein said plurality of flight parameters comprises a mandatory set of flight parameters and an optional set of flight parameters, said mandatory set of flight parameters and said optional set of flight parameters being determined by the type of said aircraft.

6. The apparatus according to claim 1, wherein said processor modifies at least one dimension of said respective suitable protection envelope for said aircraft based on a subset of said plurality of monitored flight parameters.

7. The apparatus according to claim 6, wherein said subset of said plurality of flight parameters comprises at least one of:
    a vertical speed;
    a weight;
    an altitude;
    said estimated flight regime;
    a type of aircraft; and
    a make of aircraft.

8. Method for defining a protection envelope in an aircraft, the method comprising the procedures of:
    monitoring a plurality of flight parameters of said aircraft, excluding a speed of said aircraft;
    dividing the protection envelope of said aircraft into predefined flight regimes;
    for each predefined flight regime, defining and storing a suitable protection envelope;
    calibrating a neural network based algorithm to map said monitored plurality of flight parameters to said suitable protection envelope for said aircraft based on an estimated flight regime;
    determining said estimated flight regime for said aircraft based on said monitored plurality of flight parameters using said calibrated neural network based algorithm; and
    selecting said suitable protection envelope for said aircraft based on said estimated flight regime.

9. The method according to claim 8, further comprising the procedure of modifying at least one dimension of said selected suitable protection envelope based on a subset of said plurality of monitored flight parameters.

10. The method according to claim 9, further comprising the procedure of modifying at least one dimension of said selected suitable protection envelope based on at least one of:
    a vertical speed;
    a weight;
    an altitude;
    said estimated flight regime;
    a type of aircraft; and
    a make of aircraft.

11. The method according to claim 8, further comprising the procedure of collecting data for a particular type of said aircraft, said data substantially representing said plurality of flight parameters.

12. The method according to claim 11, wherein said collected data is collected from a 6 degree of freedom (DOF) simulation of said particular type of said aircraft.

13. The method according to claim 11, wherein said collected data is collected from an actual flight of said particular type of said aircraft.

14. The method according to claim 8, wherein said neural network based algorithm is a backpropagation algorithm.

15. The method according to claim 8, further comprising the procedures of:
    generating a plurality of flight parameter test cases; and
    testing the performance of said calibrated neural network based algorithm.

16. The method according to claim 8, wherein said neural network based algorithm comprises a neural architecture comprising an input layer, at least one hidden layer and an output layer.

17. The method according to claim 8, wherein said procedure of calibrating said neural network based algorithm comprises the sub-procedures of:
    generating a plurality of flight parameter validation cases; and
    defining a stopping rule.

* * * * *